(12) United States Patent
Pallinger

(10) Patent No.: US 6,227,344 B1
(45) Date of Patent: May 8, 2001

(54) CONNECTING DEVICE FOR TRANSPORT CHAINS

(75) Inventor: Reinhard Pallinger, Vienna (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 09/207,475

(22) Filed: Dec. 8, 1998

(30) Foreign Application Priority Data

Dec. 17, 1997 (EP) .................................................. 97810991

(51) Int. Cl.$^7$ ........................................................ B66B 23/00
(52) U.S. Cl. ............... 198/330; 198/867.09; 198/867.15; 198/681
(58) Field of Search ................................... 198/330, 681, 198/803.2, 851, 865.15, 867.09

(56) References Cited

U.S. PATENT DOCUMENTS

| | | | |
|---|---|---|---|
| 1,043,542 | * 11/1912 | Seeberger | 198/300 |
| 2,005,067 | * 6/1935 | Graff-Baker | 198/330 |
| 2,906,390 | * 9/1959 | Hefti | 198/330 |
| 4,361,220 | * 11/1982 | Kraft | 198/330 |
| 5,415,265 | * 5/1995 | Kubota | 198/330 |
| 5,782,166 | * 7/1998 | Hoefling et al. | 198/330 |
| 5,819,910 | * 10/1998 | Langer et al. | 198/330 |

FOREIGN PATENT DOCUMENTS

| | | | | |
|---|---|---|---|---|
| 606990 | 7/1994 | (EP) | | B66B/23/02 |
| 2056093 | 3/1979 | (GB) | | F16D/1/06 |

* cited by examiner

*Primary Examiner*—Douglas Hess
(74) *Attorney, Agent, or Firm*—Schweitzer Cornman Gross & Bondell LLP

(57) ABSTRACT

A connecting device for transport chains for the support and entrainment of plates for moving walkways or of steps for escalators of the type having two parallel chain runs to be joined together at a transverse spacing by connecting tubes serves to fasten the chain runs to the connecting tubes in a manner which facilitates subsequent detachment. Axle stubs of chain pins, which are constructed as support roller axles are pushed into the connecting tubes at both ends and are mechanically positively firmly held in an end position by slots in the connecting tube, a circular recess in the axle stub and a spring clip. The mechanically positive coupling is effected after the snapping of the spring clip through the slot into the circular recess of the axle stub, as in the end position of slot and circular recess are aligned with each other.

3 Claims, 2 Drawing Sheets

CONNECTING DEVICE FOR TRANSPORT CHAINS

The prevent invention relates to a connecting device for transport linkages or chains used for the support and entrainment of plates for moving walkways or of steps for escalators.

BACKGROUND OF THE INVENTION

Transport chains for moving walkways and the like commonly consist of two chain runs, each having chain links, support rollers, and chain pins which also serve as support roller axles. Stub ends of the chain pins are inserted into connecting tubes which thus join the chain runs together at transverse spaced intervals.

A connecting device for such transport chains can be produced in various ways. One common practice consists of drilling a hole through the connecting tube and the axle stub when the axle stub is pushed in, through which hole, for example, a tightening pin is then driven. This drilling and pinning requires a relatively large amount of costly manual work, equally for disassembly in the case of possible repairs.

EP 0 606 990 describes and shows two variants of a connecting device, in which in the first variant the connecting tube has an inner annular groove as well as a countersunk mouth and the pushed-in axle stub has a spring-loaded ball notching into this annular groove. In the second variant the axle stub has a spring ring in a cut groove, which, on pushing of the axle stub into the connecting tube, springs into the annular groove of the connecting tube in its end position and fixes the axle stub.

Such devices do not permit the disassembly or removal of the axle and axle stub if the depth of penetration of the spring-loaded ball or the spring ring is greater than half the diameter thereof. If the depth of penetration of the spring-loaded bail or the spring ring is smaller than half the diameter hereof, then the thereby reduced retaining force can make possible a lateral displacement of the axle stub in the connecting tube under the effects of vibration.

The object of the present invention resides in creating a connecting device between an axle stub of a support roller axle and the connecting tube which ensures a reliable retaining force of the support roller axle or the axle stub in the connecting tube and which enables an easy and problem-free mounting and demounting of the parts connected therewith.

BRIEF DESCRIPTION OF THE INVENTION

The connecting device according to the invention is distinguished by the fact that a shake-free connection between the axle stub of the support roller axle and the connecting tube is formed by means of the combination of a circular recess in the axle stub of the support roller axle, at least one milled slot in the connecting tube, and a spring clip inserted in the milled slot or slots contacting the circular recess to maintain the axle stub in position within the connecting tube. The connection can be readily released again at any time by removal of the spring clip without expenditure of significant force.

The axle stub may have a conical insertion end, constructed as an assembly cone, which enables insertion or pushing-in of the axle stub when the spring clip is previously inserted upon the connecting tube. An automatic detenting of the spring clip in the circular recess in the final position of the axle stub in the connecting tube occurs when the axle stub is inserted.

Due to the circular shape, depth and arrangement of the recess, the width of the slots and the shape of the spring clip, a mechanically positive connection between axle stub and connecting tube is formed after the detenting of the spring clip's through slot into the circular recess of the axle stub. The axle stub is thus immovably retained in the connecting tube, wherein the snap-in depth of the spring clip in the circular recess is greater than half the diameter of a spring clip made with round wire.

The spring clip can be executed as a simple and inexpensive punched part, preferably of spring sheet steel of suitable resilience and thickness, without additional processing.

The spring clip can, as a variant, also be formed of spring steel round wire with an appropriate diameter and matched resilience. Such a part can be quickly and inexpensively produced on a spring wire forming machine.

The guidance of the spring clip in the connecting tube is performed by the radial milled slot or slots. Extension of the axle stub under step and plate supports mounted to the connection and can reinforce to a point or beyond the bending strength of the connecting tubes.

BRIEF DESCRIPTION OF THE DRAWINGS

The invention is more closely explained in the following by reference to an example of embodiment and illustrated in the drawings, in which.

DETAILED DESCRIPTION OF THE INVENTION

Figure 1:
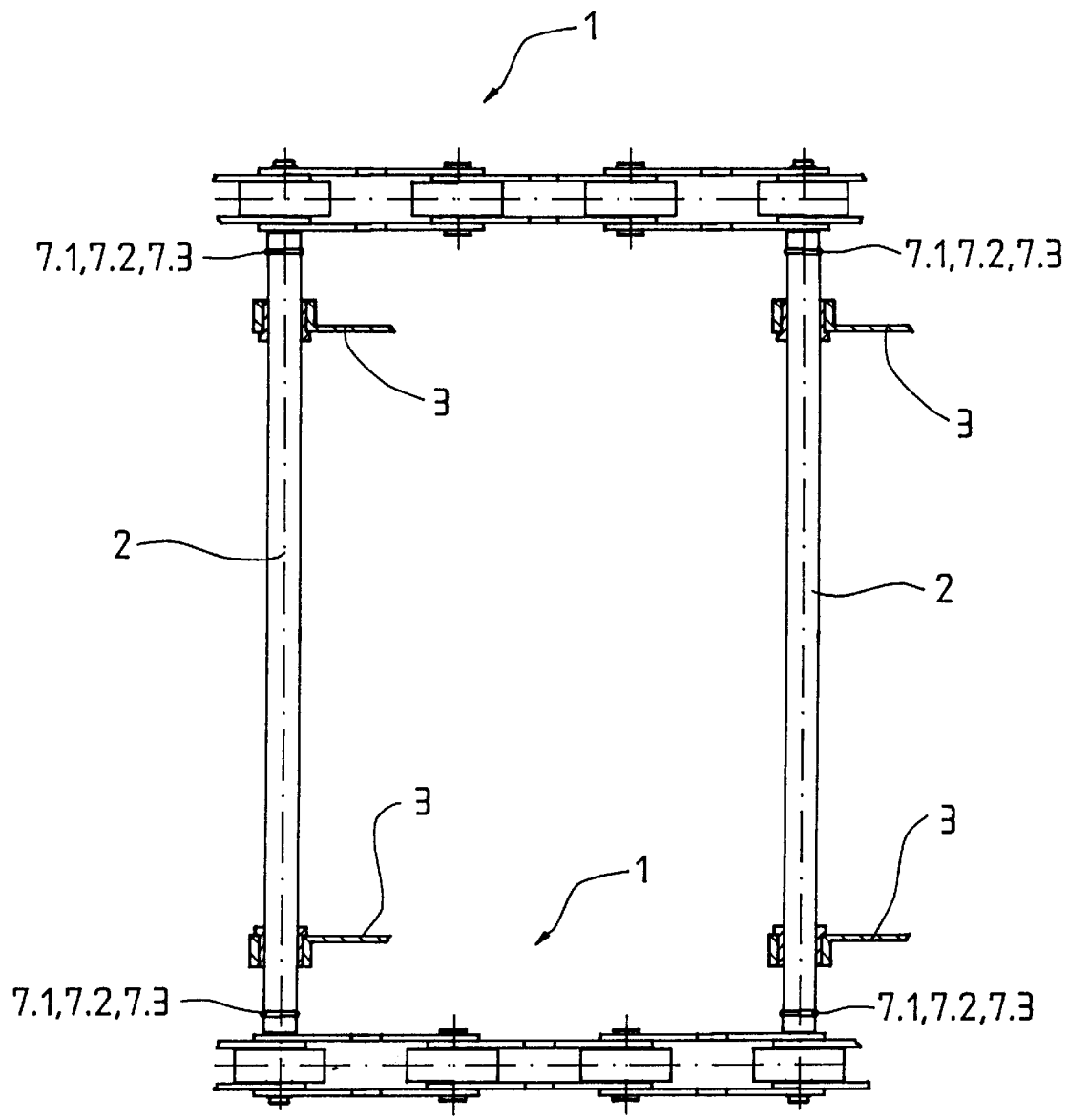
FIG. 1 shows a transport chain with chain runs and connecting tubes.

FIG. 1 shows a portion of a transport chain as is generally used for conveying installations for persons, such as rolling walkways and escalators. It essentially consists of two parallel, lateral chain runs 1, which are joined together at a transverse spacing by means of a connection device which includes connecting tubes 2. A part of the connecting device, by means of which the chain run 1 is coupled to connecting tubes 2, is indicated by elements 7.1, 7.2 and 7.3 in FIGS. 1, 2 and 3, respectively. Further, two step or plate supports 3, which are components of the steps or plates of the installation (not illustrated) are arranged on each of the connecting tubes 2.

Figure 2A:
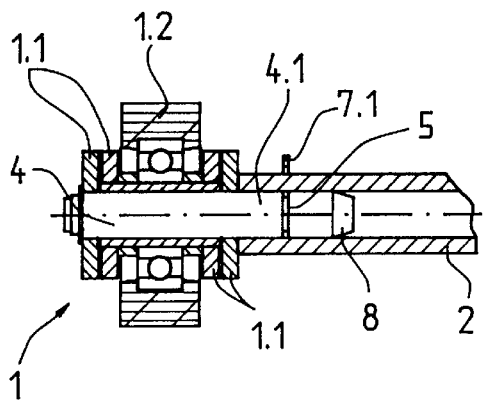
FIG. 2a shows, in longitudinal section, the connecting device of the present invention having a punched-out spring clip.

With reference to FIG. 2a, a chain run 1 essentially consists of coupling chain links 1.1 joining chain pins 4, which form support roller axles for support rollers 1.2. The chain pins 4 extend inwardly to form axle stubs 4.1, which are pushed into the ends of connecting tubes 2 and fixed therein by means of the connecting device. The axle stub 4.1 has, somewhat spaced from its righthand (interior) end, a circular recess 5, which, in the same radial plane, is in operative connection with a spring clip 7.1. The end of the axle stub 4.1 is turned down to a cone frustum and thus forms an assembly cone 8. Due to this assembly cone 8, the spring clip 7.1 can be inserted into the connecting tube before the axle stub is inserted, as the assembly cone end of the axle stub 4.1 acts as a double wedge which, during insertion of the axle stub, widens out the arms spring clip 4.1 to the diameter of axle stub 4.1 until, on attainment of the end position of the axle stub 4.1 in the connecting tube 2, the spring clip springs into the circular recess 5.

Figures 2B, 2C:
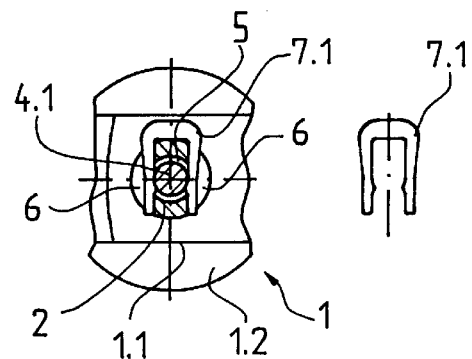
FIG. 2b shows the connecting device in radial section.
FIG. 2c shows the punched-out spring clip.

With reference to FIG. 2b, slots 6 milled into the connecting tube 2 at both sides are apparent as a further detail of the connecting device. The slots 6 are located to align with the circular recess 5 upon full insertion of the axle stub and form, together with the circular recess 5, a guide for the spring clip 7.1. In this manner a mechanically positive connection between axle stub 4.1 and connecting tube 2 results when the spring clip 7.1 is inserted. In the relieved state, the U-shaped spring clip 7.1 has a spacing between the vertical limbs which is somewhat smaller than the diameter in the circular recess 5 of the axle stub 4.1. This feature has the desired effect that the inserted spring clip 7.1 continues to bear at the diameter in the circular recess 5 of the axle stub 4.1 an intended biassing force. Moreover, and as seen in FIG. 2c, the inward-facing profile of the spring clip 7.1 has projections at appropriate locations, which projections provide a snap action on insertion of the spring clip and reliably retaining the spring clip in the inserted position. As the projections have oblique flanks, the spring clip 7.1 can also be withdrawn again in problem-free manner, for example, in the case of repair operations.

As further depicted in FIG. 2c, the bevelled limb ends of the spring clip cause spreading of the spring clip during insertion into the slots 6 of the connecting tube 2 and into the circular recess 5 of the axle stub 4.1. In addition, a bore in the yoke part of the spring clip can be provided to allow for the insertion of a drag hook for pulling out the spring clip. This shape and kind of spring clip 7.1 makes possible the simple production thereof as a punched part producible inexpensively in large batches. Spring sheet steel or hardened sheet steel is preferably used as the material.

Figure 3A:
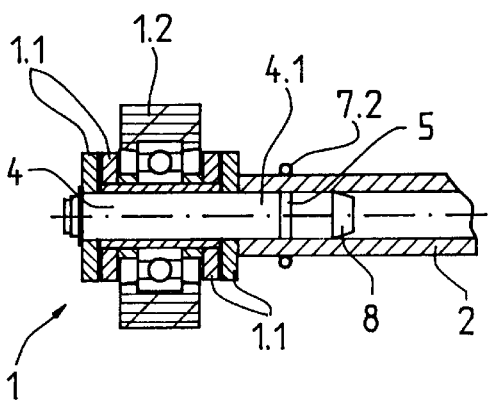
FIG. 3a shows, in longitudinal section, the connecting device of the present invention with a round wire spring clip.
Figures 3B, 3C:
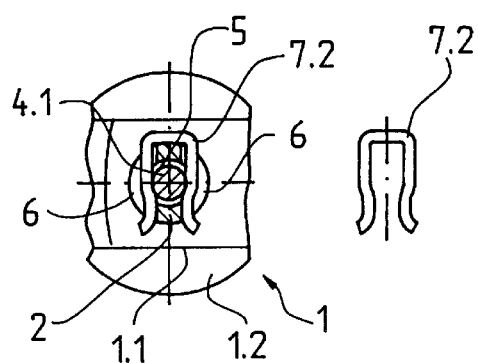
FIG. 3b shows the connecting device of FIG. 3b in radial section.
FIG. 3c shows the round wire spring clip.

FIGS. 3a–3c depict a second embodiment of the connecting device of the present invention, which differs from the first embodiment in that a spring clip 7.2 is used which is formed from spring steel round wire. The consequence of the use of this construction consists in that the circular recess 5 in the axle stub 4.1, conforming to the diameter of the spring steel wire, is wider, as can be seen in FIG. 3a, to accommodate the thickness of the wire.

Similarly, as a consequence of the use of the spring clip 7.2 the millings 6 in the connecting tube 2, as seen in FIG. 3b, may be required to be somewhat wider than in the first variant.

FIG. 3c depicts a shape for a spring clip 7.2. The arms of the clip curve inwardly to provide the snap action fit upon the axle stub and then curve outwardly to facilitate insertion when the is axle stub is in position. Such a spring clip 7.2 can be inexpensively produced from spring steel wire in large batches by means of a spring forming machine. An advantage of this mode of manufacture is minimal tooling costs.

Figure 4A:
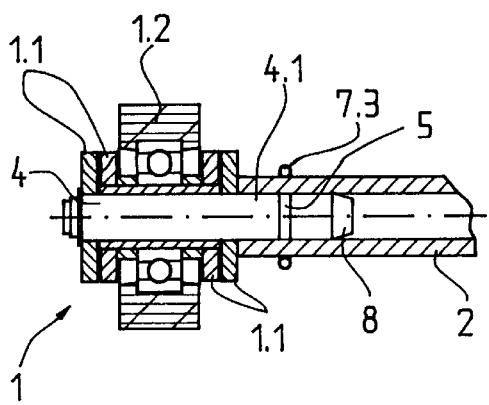
FIG. 4a shows, in longitudinal section, an embodiment of the connecting device of the present invention with milling at one side and an asymmetrical round wire spring clip.
Figures 4B, 4C:
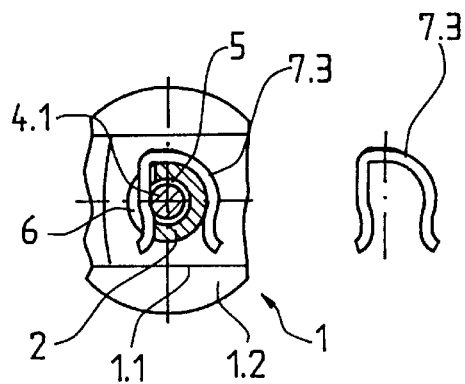
FIG. 4b shows the connecting device of FIG. 4a in radial section.
FIG. 4c shows the asymmetrical round wire spring clip.

FIGS. 4a–4c show a third variant of the connecting device according to the invention. In FIG. 4a, no visual difference from that of the second variant can be seen. The spring clip 7.3 similarly consists of spring steel round wire.

The differences relative to the first and second variants is apparent in FIG. 4b, however, in the milled slot 6 in the connecting tube 2. This slot 6 is present on only one side of the connecting tube, whereby smaller cross-sectional reduction by way of such milling into the connecting tube is required. The spring clip 7.3 is thus so shaped that only one of the two limbs—here the lefthand one—produces the mechanically positive connection between the connecting tube 2 and the axle stub 4.1. The righthand limb of the spring clip 7.3 is snapped over the entire unreduced diameter of the connecting tube 2.

FIG. 4c further depicts the asymmetrical shape of the spring clip 7.3 which is, as already mentioned, the consequence of the one-side milling into the connecting tube 2. Such a shape, however, will not normally cause any special manufacturing problems. The shown shape having a straight lefthand side and a curved righthand side, prevents insertion in reversed position, which may otherwise be possible with asymmetrical parts, because this depicted shape, having a large radius at the top right as shown in FIG. 4c, makes impossible a full insertion and engagement in the reversed position.

In all variants the assembly cone 8 fulfills the same function, by means of which the axle stub 4.1, with the spring clip 7.1/7.2/7.3 previously inserted in the connecting tube, can be pushed in until abutment against the chain links 1.1, with the penetrating, opening and subsequent snapping-in of the spring clip. The snap-in position is also the end position of the axle stub 4.1 in the axle tube 2, in which the snapping of the spring clip into the circular recess 5 takes place and a mechanically positive connection between the axle stub 4.1 and connecting tube 2 is produced. For demounting of the axle stub 4.1 the spring clip can be withdrawn with very little expenditure of force, whereupon the axle stub 4.1 is free and can be withdrawn from the connecting tube 2 easily.

Any cross-sectional weakening by the milled slot 6 can be compensated for by a simple measure of extending the axle stub 4.1 somewhat longer. Such a longer axle stub 4.1 may, for example, protrude as far as to be under the step or plate supports 3 or even somewhat further into the connecting tube 2. Such an arrangement again utilizes, with little material extra cost, the bending strength of the corresponding unmilled portion of connecting tube 2 on either or both sides of the milled area.

The shape and material of the spring clip can be realized not only in the particular forms depicted in the Figures. Further, any metallic or even non-metallic material, which has the necessary resilient properties, can be used. Similarly, the shape and profile of the spring clip can, with the same functional features, vary.

I claim:

1. A connecting device for transport chains for the support and entrainment of plates for moving walkways or of steps for escalators, wherein the transport chains consist of two chain runs which are arranged to be parallel and are joined together at a transverse spacing by connecting tubes, the transport chains comprising chain links, support rollers, and chain pins which are constructed as support roller axles with axle stubs, and wherein the connecting device firmly retains the axle stubs which are pushed into the connecting tubes, the connecting device comprising: a spring clip, at least one slot in the connecting tube, and a circular recess in the axle stub, said at least one slot and said circular recess being aligned when the axle stub is fully pushed into the connecting tube, the spring clip having means to engage the circular recess through the slot in a snap fit when the axle stub is pushed in.

2. A connecting device according to claim 1, characterized in that the spring clip is formed of a wire having a diameter, the circular recess having a recess depth larger than half the diameter of the wire.

3. A connecting device according to claim 1, characterized in that the axle stub includes an assembly cone at an end thereof, said assembly cone having means for aligning the axle stub upon insertion into the connecting tube and directing the axle stub past opposed legs of a spring clip previously placed in the at least one slot of the connecting tube.

* * * * *